J. PEDERSON
WINDSHIELD CLEANER.
APPLICATION FILED AUG. 30, 1920.
1,370,909.
Patented Mar. 8, 1921.
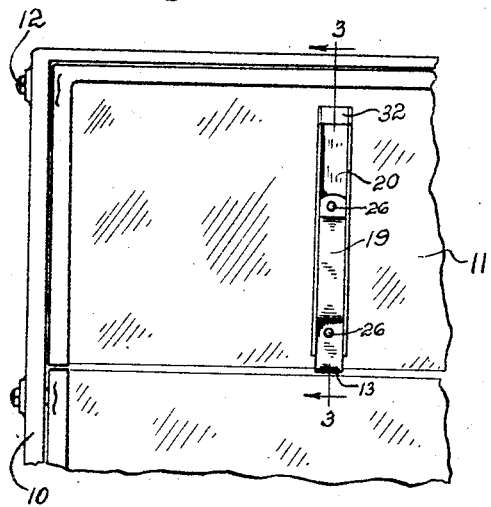
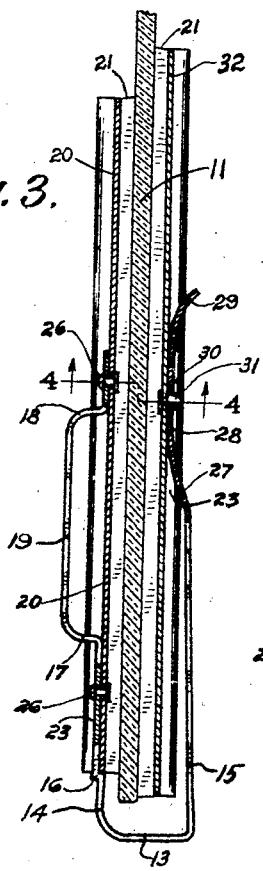
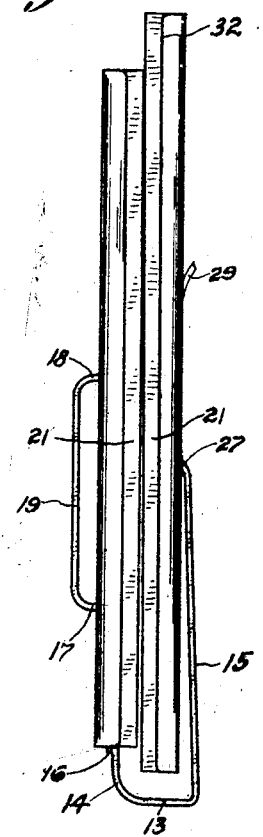
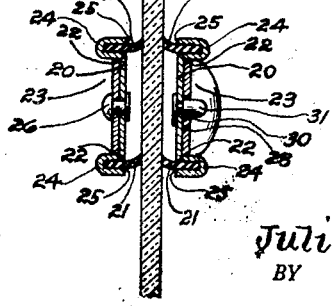
INVENTOR.
Julius Pederson
BY
Chamberlain & Newman
ATTORNEYS.

UNITED STATES PATENT OFFICE.

JULIUS PEDERSON, OF BRIDGEPORT, CONNECTICUT.

WINDSHIELD-CLEANER.

1,370,909.     Specification of Letters Patent.     Patented Mar. 8, 1921.

Application filed August 30, 1920. Serial No. 406,949.

*To all whom it may concern:*

Be it known that I, JULIUS PEDERSON, a citizen of the United States, and resident of Bridgeport, in the county of Fairfield and State of Connecticut, have invented certain new and useful Improvements in Windshield-Cleaners, of which the following is a specification.

This invention relates to windshield cleaners of the type adapted to simultaneously engage and wipe both faces of the glass of a windshield, and the object of the invention is to provide a cleaner of the present character which will be simple in construction and durable in use, and one which can be easily and quickly applied to a windshield in proper position for ready and efficient manipulation.

With the above and other objects in view, the invention comprises the construction, arrangement and combination of parts as now to be fully described and hereinafter specifically claimed.

In the accompanying drawing forming a part of this specification,

Figure 1 is a view of a portion of the rear face of a windshield, showing the cleaner as when applied for use;

Fig. 2 is a side view of the cleaner as when removed from the windshield;

Fig. 3 is a section on line 3—3 in Fig. 1, looking in the direction of the arrows; and Fig. 4 is a section on line 4—4 in Fig. 3, looking in the direction of the arrows.

Referring to Fig. 1, 10 denotes a windshield of ordinary or preferred construction and 11 denotes the upper glass of said windshield which may be pivotally supported in usual manner, as indicated at 12.

The windshield cleaner of the invention comprises, broadly, a pair of wiper members, one of which is adapted to be arranged on the front side of glass 11 and the other of which is adapted to be arranged on the rear side thereof, and a wiper member holder for causing both wiper members to snugly engage the glass. As shown, the wiper member holder consists of an elongated U-shaped member of metal, the base of which is denoted by 13 and the resilient arms of which are denoted by 14 and 15, respectively. Arm 14 is preferably offset as indicated at 16, and is bent outwardly, as indicated at 17 and inwardly as indicated at 18 to provide a handle portion 19 by means of which the cleaner is adapted to be manipulated.

As disclosed more clearly in Fig. 4, each wiper member consists of a wiper bar 20 and a pair of flexible wiper strips 21 of material suitable for their purpose. Each wiper bar preferably comprises a single strip of metal the opposite side edges of which are first bent at approximate right angles to the strip, as indicated at 22, to form ways 23 for a purpose to be explained, and are then curved around as indicated at 24 to form channels 25 to receive the rear edges of the flexible wiper strips. It will of course be understood that the side walls of the channels are forced toward each other after the strips are inserted and that the flexible wiper strips are thus effectually gripped in position.

As clearly disclosed in Figs. 3 and 4, each resilient arm of the elongated U-shaped metal member, or wiper member holder, is adapted to support a wiper bar, the resilient arms, as shown, being arranged in the ways of the wiper bars. Arm 14 is preferably rigidly secured to its wiper bar by means of a pair of rivets, denoted by 26, which pass through perforations in the bar and arm, respectively, the perforations in the resilient arm, for convenience, being arranged one just above the other just below the handle portion, and the lower end of said bar preferably extends to offset 16 in said arm. The base of the wiper member holder is of such length that arms 14 and 15 are spaced from each other a sufficient distance to allow said arms to clear the lower edge of the windshield glass when in position thereon, as is suggested in Figs. 3 and 4 and as will be obvious. Arm 15, as very clearly disclosed in Fig. 3, is bent inwardly at 27 to provide an offset portion 28 which is spaced from arm 14 a proper distance to cause the wiper members to snugly grip the glass of the windshield, as will be understood. The outer end of offset portion 28 preferably merges into a finger piece 29, see Figs. 2 and 3, and intermediate its length this offset portion is perforated as denoted at 30 to freely and removably receive the head 31 of a rivet located in the midlength of the corresponding wiper bar. It will be seen that arm 15 is thus detachably secured to its wiper bar, and it will be understood that the bar cannot become accidentally removed from the arm, for the reason that when the cleaner is removed from the windshield the resilient arms will spring toward each other so that the wiper members bear against each other. When it is desired to remove the detachable wiper member the finger piece is drawn outwardly against the spring action of resilient arm 15 until the rivet head is removed from the perforation in offset portion 28.

As shown in Figs. 2 and 3, the wiper member carried by arm 15, that is, the one adapted to be arranged on the front face of the windshield glass, is of greater length than is the other wiper member. The purpose for this will be readily understood. When it is desired to place the cleaner on a windshield glass as suggested in Fig. 1, the glass is swung slightly on its pivot. The handle portion of the cleaner is grasped and moved to such position that the extension, denoted by 32 in Figs. 1, 2 and 3, is arranged against the front face of the glass adjacent the lower edge thereof. The handle portion is then drawn rearwardly to cause the free ends of the wiper members to move from each other a distance slightly greater than the thickness of the windshield glass. The cleaner can then be pushed upon the glass, as will be obvious. It will be evident that the cleaner can be applied to the windshield glass with the use of but a single hand.

As the offset portion of arm 15 is arranged in the way of its wiper bar, and as the resiliency of arm 15 causes the head of the rivet to remain in the perforation in the offset portion, it will be evident that arm 15 will rigidly support its wiper bar, and as the offset portion of arm 15 engages its wiper bar midway the length of said wiper bar, it will be evident that this wiper bar, as well as the one secured to arm 14, will exert uniform pressure on the windshield glass and can be evenly and smoothly drawn across said windshield glass.

It is to be understood of course that the cleaner can be applied to any windshield or the like in connection with which it is capable of use without departing from the spirit of the invention.

I claim:

1. A windshield cleaner comprising a pair of wiper members adapted to engage opposite faces of a pane of glass, and a holder member for said wiper members, each of said wiper members consisting of a wiper bar with a plurality of wiper strips, each wiper bar comprising a single strip of resilient material the opposite side edges of which are bent to provide ways and are curved over to provide channels to receive the wiper strips, and said holder member comprising an elongated U-shaped member of resilient material the arms of which are adapted to rest in the ways of the wiper bars, respectively, and to be secured to said wiper bars, one of said bars provided at its midlength with a protuberance, and one of said resilient arms provided with an offset portion having a perforation to receive said protuberance, whereby said last mentioned bar is detachably secured to said holder member.

2. A windshield cleaner comprising a pair of wiper members adapted to be positioned on opposite faces of a windshield glass, and a holder member adapted to cause said wiper members to exert uniform pressure on said glass, said wiper members each consisting of a wiper bar and wiper strips, each of said wiper bars comprising a single strip of material bent to provide ways and curved about to provide channels for said wiper strips, and said holder member comprising a U-shaped resilient member the arms of which rest in said ways and are secured to said wiper bars, respectively, one of said arms provided with an offset portion, said offset portion provided with a perforation, and one of said wiper bars having a protuberance midway its length which is adapted to enter said perforation, whereby said last mentioned bar is detachably secured to said offset portion in such manner that it can be evenly and smoothly drawn across said windshield glass.

3. A windshield cleaner comprising a pair of wiper members adapted to be positioned on opposite faces of a windshield glass and a holder member for said wiper members adapted to cause said wiper members to snugly grip said glass, said holder member comprising an elongated U-shaped resilient member one arm of which is rigidly secured to one of said wiper members and the other arm of which is provided with a flat surface having an opening, and the other of said wiper members having at its midlength a pin adapted to removably enter said opening, whereby said other wiper member is pivotally secured to said holder.

Signed at Bridgeport, in the county of Fairfield and State of Connecticut, this 23rd day of August, A. D. 1920.

JULIUS PEDERSON.

Witnesses:
C. M. NEWMAN,
WM. G. ROCKWELL.